(12) United States Patent
Yoon et al.

(10) Patent No.: US 7,649,593 B2
(45) Date of Patent: Jan. 19, 2010

(54) BACKLIGHT UNIT AND LIQUID CRYSTAL DISPLAY HAVING THE SAME

(75) Inventors: Ju-young Yoon, Gyeonggi-do (KR); Gi-cherl Kim, Gyeonggi-do (KR); Hyun-jin Kim, Seoul (KR); Sang-yu Lee, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 234 days.

(21) Appl. No.: 11/400,300

(22) Filed: Apr. 6, 2006

(65) Prior Publication Data

US 2006/0244879 A1 Nov. 2, 2006

(30) Foreign Application Priority Data

Apr. 29, 2005 (KR) .................. 10-2005-0036094

(51) Int. Cl.
*G02F 1/1335* (2006.01)
(52) U.S. Cl. .......................... 349/69; 349/70
(58) Field of Classification Search .................. 349/69, 349/70; 362/600, 614
See application file for complete search history.

(56) References Cited

U.S. PATENT DOCUMENTS

| 2,378,239 | A | | 6/1945 | Myron |
|---|---|---|---|---|
| 3,110,667 | A | | 11/1963 | Stuppy |
| 6,898,018 | B2 | * | 5/2005 | Minoura et al. ............. 359/627 |
| 2002/0085379 | A1 | | 7/2002 | Han et al. |
| 2003/0076034 | A1 | | 4/2003 | Marshall et al. |
| 2004/0262623 | A1 | | 12/2004 | You |
| 2005/0073495 | A1 | | 4/2005 | Harbers et al. |
| 2005/0169007 | A1 | | 8/2005 | Chou |

FOREIGN PATENT DOCUMENTS

| CN | 1558284 A | 12/2004 |
|---|---|---|
| EP | 1 103 759 A2 | 5/2001 |
| EP | 1 521 235 A3 | 4/2005 |
| JP | 2002-072901 | 12/2002 |
| JP | 2003-068109 | 7/2003 |
| JP | 2003-298113 | 10/2003 |
| JP | 2004-319458 | 11/2004 |
| KR | 2001 0068818 | 7/2001 |
| WO | WO 00/49332 | 8/2000 |
| WO | WO 2006/010429 | 2/2006 |

OTHER PUBLICATIONS

Partial European Search Report, EP 06 00 8588, mailing date Jun. 22, 2006.

(Continued)

*Primary Examiner*—David Nelms
*Assistant Examiner*—David Y Chung
(74) *Attorney, Agent, or Firm*—Innovation Counsel LLP

(57) ABSTRACT

A backlight unit comprises an arrangement surface and a plurality of point light sources arranged on the arrangement surface, wherein the arrangement surface is divided into an array of hexagonal cells, a plurality of the cells comprising a white light providing unit. An LCD comprising a backlight unit on which a point light source is efficiently disposed and an efficient arrangement method of a point light source are provided.

47 Claims, 15 Drawing Sheets

OTHER PUBLICATIONS

Extended European Search Report, EP 06 00 8588, mailing date Aug. 17, 2006.

EP Application No. EP07251543; European Partial Search Report, Oct. 5, 2007.

EP Application No. EP07251543: European Extended Search Report, Jan. 29, 2008.

U.S. Appl. No. 11/812,848, filed Jun. 22, 2007.

* cited by examiner

BACKLIGHT UNIT AND LIQUID CRYSTAL DISPLAY HAVING THE SAME

CROSS-REFERENCE TO RELATED APPLICATIONS

This application claims the benefit of Korean Patent Application No. 2005-0036094, filed on Apr. 29, 2005, in the Korean Intellectual Property Office, the disclosure of which is incorporated herein by reference.

BACKGROUND

1. Field of the Invention

The present invention relates to a backlight unit and a liquid crystal display having the same, and more particularly, to a backlight unit and a liquid crystal display having the same on which a point light source is efficiently disposed.

2. Description of the Related Art

Recently, flat panel display apparatuses, such as LCD (liquid crystal display), PDP (plasma display panel), and OLED (organic light emitting diode) display types, has been developed in place of a CRT (cathode ray tube) display type.

A typical liquid crystal display (hereinafter referred to as 'LCD') comprises an LCD panel having a TFT substrate, a color filter substrate, and a liquid crystal layer disposed between the two substrates. Since the liquid crystal layer does not emit light, the LCD may comprise a backlight unit disposed in rear of the TFT substrate. The amount of light emitted from the backlight unit which is transmitted through the liquid crystal is adjusted according to an alignment of the liquid crystals in the liquid crystal layer. The LCD panel and the backlight unit are provided in a chassis.

Depending on the location of the light source, the backlight unit may be an edge type or a direct type backlight unit. The edge type provides the light source at a lateral side of a light guiding plate and is typically used for a relatively small LCDs, such as those used in laptops and desktop computers. The edge type provides a high light uniformity and a good endurance, and is suitable for use in thin profile LCDs.

As a result of the increasing size of LCD displays in the market, the development of the direct type backlight unit has been emphasized. The direct type backlight unit provides the entire surface of the LCD with light by disposing a plurality of light sources in the rear of the LCD panel. The direct type backlight unit provides a high level of brightness by using a plurality of light sources, as compared with the edge type backlight unit, but the brightness is generally not sufficiently uniform.

The LED, which is a point light source, rather than a linear light source, such as a lamp, has been identified as a suitable light source for direct type backlight units, due to its high brightness and an excellent color reproducibility. A series of LEDs are generally seated on an LED circuit board in a line, and a plurality of LED circuit boards are disposed in rear of the LCD panel in parallel rows.

However, in LCDs utilizing the above-described arrangement, the brightness is high directly above the LED circuit board, but is not as high in the regions between adjacent LED circuit boards. Thus, the uniformity of the brightness of the LCD panel may be decreased.

SUMMARY

Accordingly, it is an aspect of the present invention to provide a backlight unit on which a point light source is efficiently disposed.

Accordingly, it is another aspect of the present invention to provide an LCD on which a point light source is efficiently disposed.

Accordingly, it is another aspect of the present invention to provide an efficient arrangement method of a point light source according to an LCD.

The foregoing and/or other aspects of the present invention are also achieved by providing a backlight unit comprising an arrangement surface and a plurality of point light sources on the arrangement surface, wherein the arrangement surface is divided into an array of cells, the array of cells comprising a plurality of hexagonal cells having a white light providing unit.

According to the embodiment of the present invention, the hexagonal cells are regularly disposed on the arrangement surface and each side of each cell contacts a side of an adjacent cell.

According to the embodiment of the present invention, the point light source is an LED.

According to the embodiment of the present invention, the array of cells comprises an array of inside cells having a regular hexagonal shape.

According to the embodiment of the present invention, within each inside cell, a position of the point light source is uniform.

According to the embodiment of the present invention, within each inside cell, a position of the point light source is not uniform.

According to the embodiment of the present invention, the arrangement surface has a rectangular shape having a long side and a short side.

According to the embodiment of the present invention, the array of cells further comprises a plurality of long side cells intersecting the long sides of the arrangement surface, a plurality of short side cells intersecting the short sides of the arrangement surface, and a plurality of corner cells intersecting corners of the arrangement surface.

According to the embodiment of the present invention, the long side of the arrangement surface is parallel with two opposing sides in the inside cells.

According to the embodiment of the present invention, each of the long side cells having a surface area at least 50% of the surface area of each of the inside cells is provided with the white light providing unit.

According to the embodiment of the present invention, the short side of the arrangement surface is parallel with two opposing sides in the inside cells.

According to the embodiment of the present invention, a a cell length is defined as a distance between two opposing sides of an inside cell, and a long side length of the arrangement surface is defined as a sum of an integer times of a half of the cell length plus between 10% and 40% of the cell length.

According to the embodiment of the present invention, the short side cells comprise a first short side cell comprising the white light providing unit and a second short side cell not comprising the white light providing unit, and the first and second short side cells are alternatingly arranged along the short sides of the arrangement surface.

According to the embodiment of the present invention, the long side cells are disposed in a line along each of the long sides of the arrangement surface, and a surface area of each of the long side cells is at least 60% of the surface area of each of the inside cells.

According to the embodiment of the present invention, each of the long side cells includes one of the white light providing units.

According to the embodiment of the present invention, each of the white light providing units comprises a pair of green LEDs, and the pair of green LEDs are disposed in a direction parallel to the long sides of the arrangement surface.

According to the embodiment of the present invention, each of the white light providing units comprises a pair of red LEDs, and the pair of red LEDs are disposed in a direction parallel to the long sides of the arrangement surface.

According to the embodiment of the present invention, the corner cells having a surface area of at least 20% of the surface area of each of the inside cells includes one of the white light providing units.

According to the embodiment of the present invention, the short side cells and the long side cells having surface areas of at least 30% of the surface area of each of the inside cells includes one of the white light providing units.

According to the embodiment of the present invention, the short side cells and the long side cells having surface areas of at least 50% of the surface area of each of the inside cells is provided with one of the white light providing units.

The foregoing and/or other aspects of the present invention are also achieved by providing an LCD comprising an LCD panel, an arrangement surface disposed adjacent to the LCD panel and a plurality of point light sources arranged in the arrangement surface, wherein the arrangement surface is divided into an array of cells, the array of cells comprising a plurality of hexagonal cells having a white light providing unit.

According to the embodiment of the present invention, hexagonal cells are regularly disposed on the arrangement surface, and each side of each cell contacts a side of an adjacent cell.

According to the embodiment of the present invention, the point light source is an LED.

According to the embodiment of the present invention, array of cells comprises an array of inside cells having a regular hexagonal shape.

According to the embodiment of the present invention, within each inside cell, a position of the point light source is uniform.

According to the embodiment of the present invention, within each inside cell, a position of the point light source is not uniform.

According to the embodiment of the present invention, the arrangement surface has a rectangular shape having a long side and a short side.

According to the embodiment of the present invention, the array of cells further comprises a plurality of long side cells intersecting the long side of the arrangement surface, a plurality of short side cells intersecting the short sides of the arrangement surface, and a plurality of corner cells intersecting corners of the arrangement surface.

According to the embodiment of the present invention, the short side of the arrangement surface is parallel with two opposing sides in the inside cells.

According to the embodiment of the present invention, a cell length is defined as a distance between two opposing sides of an inside cell, and a long side length of the arrangement surface is defined as a sum of an integer times of a half of the cell length plus between 10% and 40% of the cell length.

According to the embodiment of the present invention, the short side cells comprise a first short side cell comprising the white light providing unit and a second short side cell not comprising the white light providing unit, and the first and second short side cells are alternately arranged along the short sides of the arrangement surface.

According to the embodiment of the present invention, the long side cells are disposed in a line along each of the long sides of the arrangement surface, and a surface area of each of the long side cells is at least 60% of the surface area of each of the inside cells.

According to the embodiment of the present invention, each of the long side cells includes one of the white light providing units.

According to the embodiment of the present invention, the corner cells having a surface area of at least 20% of the surface area of each of the inside cells includes one of the white light providing units.

According to the embodiment of the present invention, the short side cells and the long side cells having surface areas of at least 30% of the surface area of each of the inside cells includes one of the white light providing units.

According to the embodiment of the present invention, short side cells and the long side cells having surface areas of at least 50% of the surface area of each of the inside cells is provided with one of the white light providing units.

According to the embodiment of the present invention, each of the white light providing units comprises a pair of green LEDs, and the pair of green LEDs are disposed in a direction parallel to the long sides of the arrangement surface.

According to the embodiment of the present invention, a plurality of circuit boards are arranged in parallel at regular intervals.

According to the embodiment of the present invention, white light providing units are disposed on the plurality of circuit boards at a regular interval.

According to the embodiment of the present invention, the white light providing units are provided in a staggered arrangement on the adjacent circuit boards.

According to the embodiment of the present invention, a cell length is defined as a distance between two opposing sides of an inside cell and corresponds to an effective length of the point light sources.

According to the embodiment of the present invention, a cell length is defined as a distance between two opposing sides of an inside cell, and is between 90% and 110% of an effective length of the point light sources.

According to the embodiment of the present invention, the effective lengths of each of the point light sources are substantially equal.

The foregoing and/or other aspects of the present invention are also achieved by providing an arrangement method of a point light source comprising disposing the point light source to dispose a unit of a surface light source in a regular hexagon shape continually on an arrangement surface corresponding to an LCD panel.

BRIEF DESCRIPTION OF THE DRAWINGS

The above and/or other aspects and advantages of the present invention will become apparent and more readily appreciated from the following description of the exemplary embodiments, taken in conjunction with the accompanying drawings of which.

DETAILED DESCRIPTION

Figure 1:
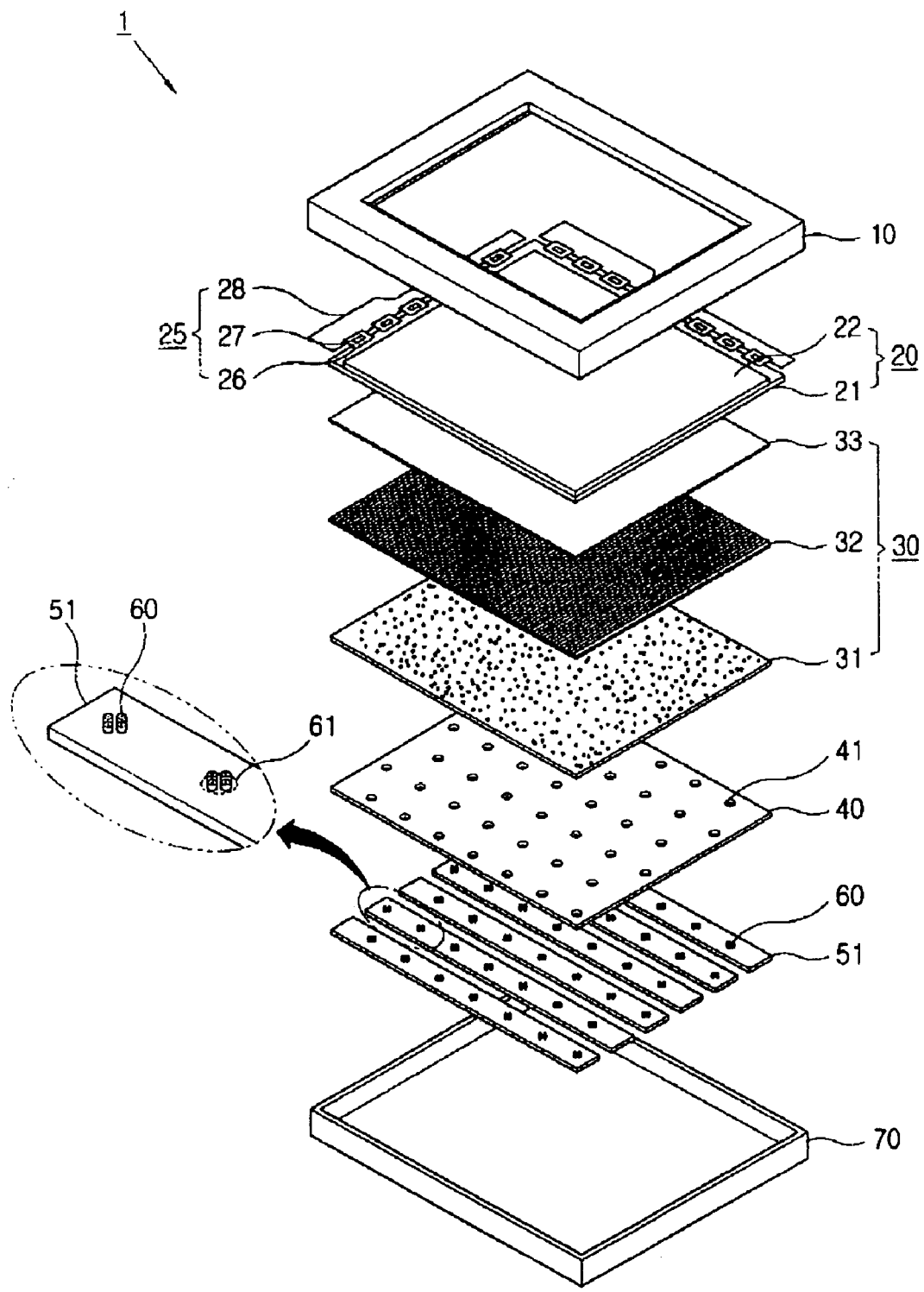
FIG. 1 is an exploded perspective view of an LCD according to a first embodiment of the present invention.

Reference will now be made in detail to exemplary embodiments of the present invention, examples of which are illustrated in the accompanying drawings, wherein like reference numerals refer to like elements throughout. The embodiments are described below in order to explain the present invention with reference to the figures.

The exemplary embodiments will be described using an LED as a point light source. However, the present invention may be applied to other types of point light sources as well.

A first embodiment of the present invention will be described with reference to the FIGS. 1 through 3.

An LCD 1 comprises an LCD panel 20, a light regulating part 30, a reflecting plate 40, and an LED circuit board 51, which are disposed sequentially in the rear of the LCD panel 20. The LCD 1 further comprises one or more LED devices 60 seated on the LED circuit board 51 and disposed corresponding to an LED aperture 41 of the reflecting plate 40.

The LCD panel 20, the light regulating part 30, and the LED circuit board 51 are accommodated between an upper chassis 10 and a lower chassis 70.

The LCD panel 20 comprises a TFT substrate 21 on which TFTs are formed, a color filter substrate 22 facing the TFT substrate 21, a sealant 23 adhering the two substrates 21 and 22 and forming a cell gap, and a liquid crystal layer 24 encompassed by the two substrates 21 and 22 and the sealant 23. The LCD panel according to the first embodiment is formed in a rectangular shape having a long side and a short side. The LCD panel 20 controls alignment of the liquid crystal layer 24, thereby forming an image thereon. However, the LCD panel 20 is provided with light from the LED devices 60 disposed at its rear, since the LCD panel 20 does not emit light by itself.

On a side of the TFT substrate 21 is disposed a driving part 25 applying driving signals to the LCD panel 20. The driving part 25 comprises a flexible printed circuit (FPC) 26, a driving chip 27 seated on the flexible printed circuit 26, and a printed circuit board (PCB) 28 connected on a side of the flexible printed circuit 26. Here, the driving part 25 shown in FIG. 1 is a COF (chip on film) type. However, other types of driving parts may be used, such as, TCP (tape carrier package) or COG (chip on glass) can be used. Alternatively, the driving part 25 can be formed on the TFT substrate 21 where wirings are formed.

The light regulating part 30 disposed in rear of the LCD panel 20 may comprise a diffusion plate 31, a prism film 32, and a protection film 33.

The diffusion plate 31 comprises a base plate and a coating layer having beads formed on the base plate. The diffusion plate 31 diffuses light from the LED devices 60, thereby improving the uniformity of the brightness.

A triangular prism is placed on the prism film 32 in a predetermined alignment. The prism film 32 concentrates the light diffused from the diffusion plate 31 in a direction perpendicular to a surface of the LCD panel 20. Typically, two prism films 32 are used, and the micro prisms formed on the prism film 32 form a predetermined angle each other. The light passing through the prism film 32 progresses vertically, thereby forming a uniform brightness distribution. If necessary, a reflective polarizing film may be used along with the prism film 32, or only the reflective polarizing film may be used without the prism film 32.

The protection film 33, positioned at the top of the light regulating part 30, protects the prism film 32, which is vulnerable to scratching.

On the LED circuit board 51 on which the LED devices 60 are seated is placed the reflecting plate 40. One or more LED apertures 41 are formed in the reflecting plate 40 corresponding to the arrangement of LED devices 60 on the LED circuit board 51. In the illustrated embodiment, the set of LED apertures 41 comprise 6 parallel lines, with each line having 7 LED apertures 41 disposed at a regular interval. The LED apertures 41 between the adjacent lines are in staggered positions relative to each other. In each LED aperture 41 is disposed a white light providing unit 61. The LED aperture 41 may be formed slightly larger than the white light providing unit 61.

Figure 2:
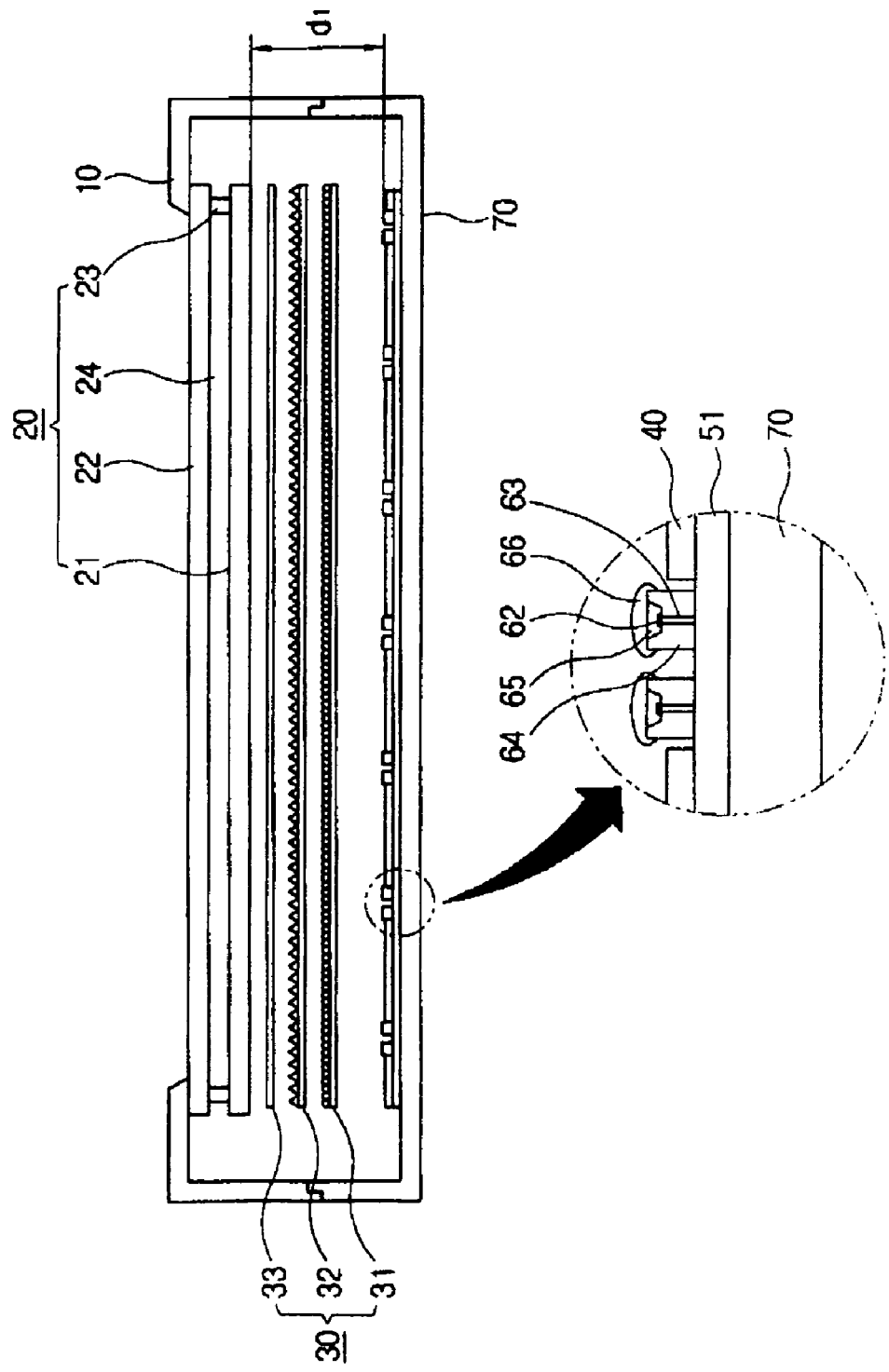
FIG. 2 is a sectional view of the LCD according to the first embodiment of the present invention.

When the reflecting plate 40 is mated with the LED circuit board 51, a portion of the LED device 60, including a chip 62 for generating light, is positioned above the upper surface of the reflecting plate 40, as can be seen in FIG. 2.

The reflecting plate 40 reflects the light delivered downward and directs the reflected light to the diffusion plate 31. The reflecting plate 40 may comprise, e.g., polyethylene terephthalate (PET) or polycarbonate (PC), and/or be coated with silver (Ag) or aluminum (Al). In addition, the reflecting plate 40 is formed with a sufficient thickness so as to prevent distortion or shrinkage due to heat generated from the LED devices 60.

In the illustrated embodiment, the LED circuit board 51 has an elongated bar shape, and six LED circuit boards 51 are positioned in parallel at regular intervals across the width of the LCD panel 20. The lengthwise direction of each LED circuit board 51 is disposed in parallel with a long side of the LCD panel 20. Because the LED device 60 may generate a significant amount of heat, the LED circuit board 51 may primarily comprise aluminum having an excellent thermal conductivity. Although not shown in Figures, the LCD 1 may further comprise a heat pipe, a radiating fin, a cooling fan, or other cooling mechanisms for removing the heat generated by the LED devices 60.

The LED devices 60, seated on the LED circuit board 51, are disposed across the entire rear surface of the LCD panel 20. LED devices 60 are disposed to comprise a plurality of white light providing units 61. In accordance with a first embodiment, each white light providing unit 61 comprises a red LED 60a, a blue LED 60c, and a pair of green LEDs 60b, for producing white light. The white light providing units 61 are disposed on the LED circuit board 51 at regular intervals.

The LED device 60 comprises a chip 62 for generating light, a lead 63 connecting the chip 62 with the LED circuit board 51, a plastic mold 64 accommodating the lead 63 and supporting the chip 62, silicon member 65, and a bulb 66 disposed over the chip 62. The pattern of light provided by the LED device 60 is largely influenced by the shape of the bulb 66. A bulb 66 according to the first embodiment has an oval shape. The bulb 66 may comprise polymetamethylacrylate (PMMA).

Figure 3:
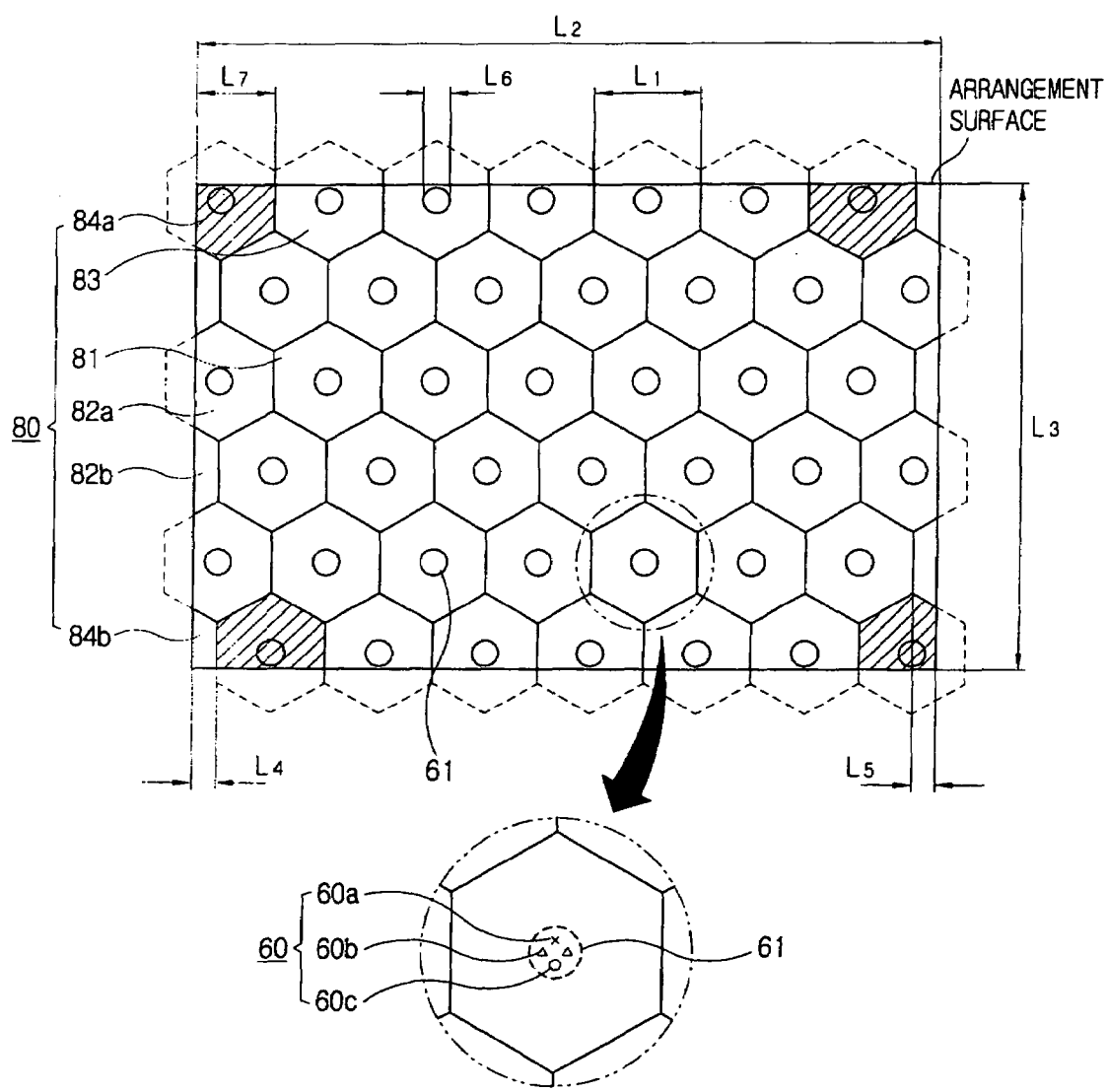
FIG. 3 illustrates an arrangement of the LCD according to the first embodiment of the present invention.

An overall arrangement of the LED devices 60 is shown in FIG. 3. Each LED device 60 is disposed on an arrangement surface corresponding to a display area of the LCD panel 20. The arrangement surface has a rectangular shape having a long side and a short side, similar to the shape of the LCD panel 20. The LED devices 60 are regularly disposed across the entire arrangement surface. The arrangement surface is divided into a honeycomb shape comprising a plurality of regular hexagons. Because the quadrangular arrangement surface is divided by hexagonal regions, each surface unit of a surface light source 80 may have various shapes. The arrangement surface is closely filled with the surface units of the surface light source 80. A cell length L1 between the adjacent cells is determined based on an effective length of the LED devices 60, and the arrangement of LED devices 60 is determined based on the cell length L1.

Hereinbelow, a description of the arrangement surface, the division of the arrangement surface into a honeycomb shape, and the effective length of the LED devices 60 will be described with reference to FIGS. 4 through 8.

Figure 4:
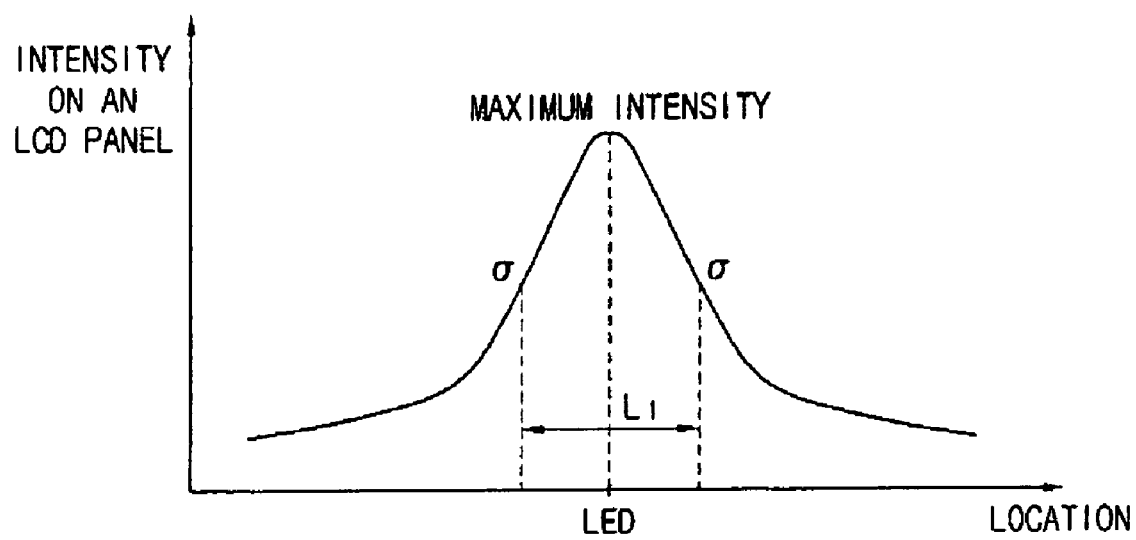
FIGS. 4 through 8 illustrate how an LED is arranged according to the first embodiment of the present invention.

Light generated from the LED device 60 is provided to the LCD panel 20. The distribution of light intensity provided to the LCD panel 20 has a Gaussian distribution, as shown in FIG. 4. That is, on the top of the LCD panel 20 at a location in the center of the LED device 60, the strongest light intensity is provided. The light intensity then decreases with increasing distance from the LED device 60. In a light intensity graph, a cell length L1 corresponding to the standard deviation is called an effective length. The effective length varies depending on a distance d1, shown in FIG. 2, between the LED device 60 and the LCD panel 20. As the distance d1 between the LED device 60 and the LCD panel 20 increases, the effective length increases and the brightness decreases. The distance d1 between the LED device 60 and the LCD panel 20 may be defined by a standard established by the chip 61 of the LED device 60. The effective length may be varied by adjusting characteristics of the LED device 60, such as radiating efficiency, a shape of bulb 66, etc.

Figure 5:
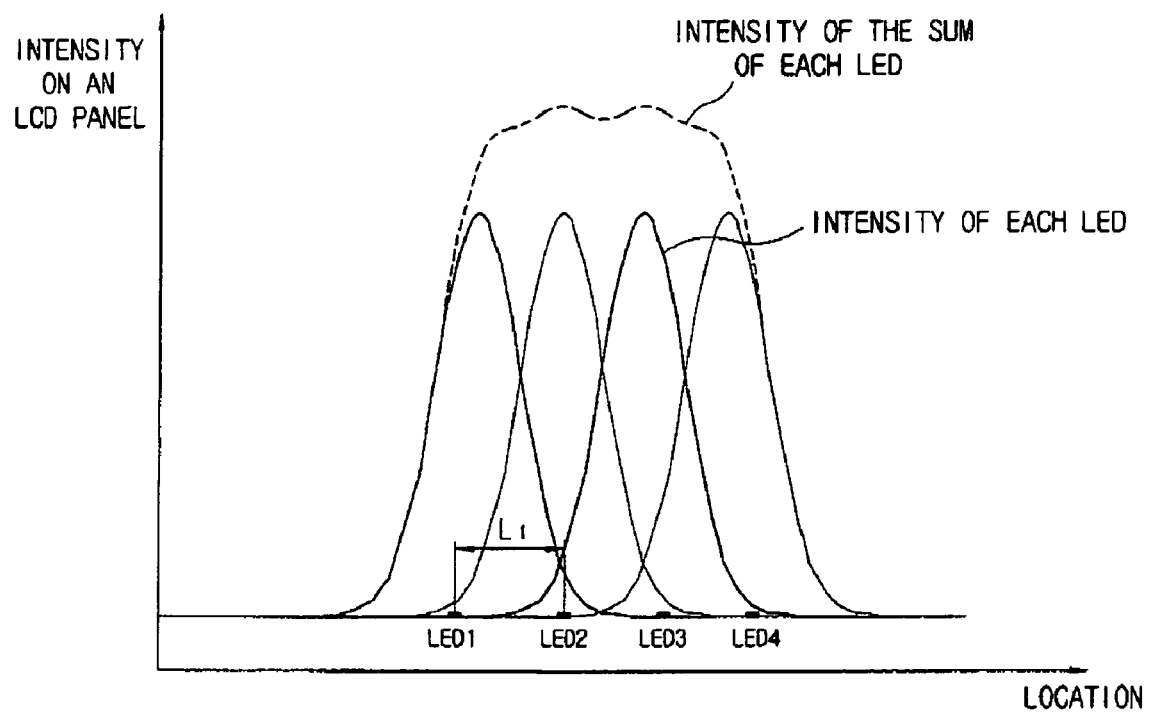

As shown in FIG. 5, when the LED devices 60 having the same effective length are disposed at intervals corresponding to the effective-length, the LCD panel 20 is provided with the same intensity of light regardless of location on the surface of the LCD panel 20.

Figure 6:
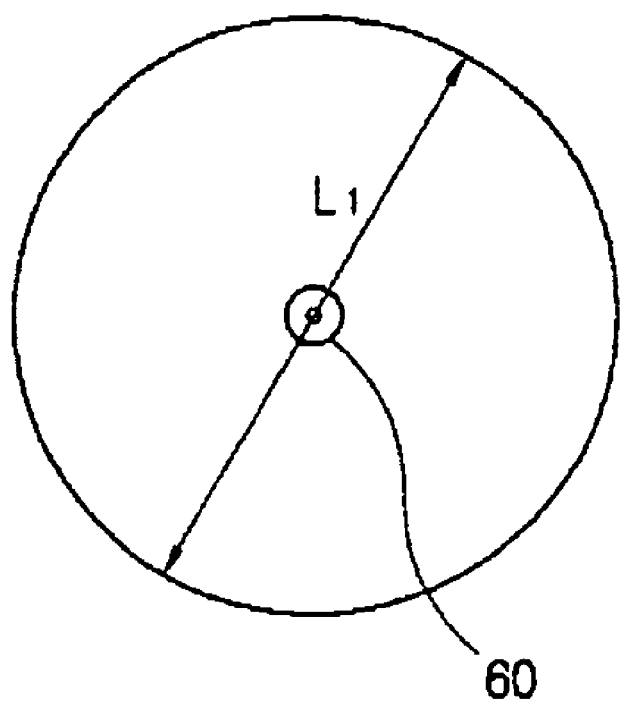

The abovementioned FIGS. 4 and 5 provide a one-dimensional illustration of the light intensity as a function of distance. FIG. 6 provides a two-dimensional illustration of the LED device 60 and the effective length. Light generated from one LED device 60 may be described as a circle with the LED device 60 as a center and the effective length as a diameter.

Figure 7:
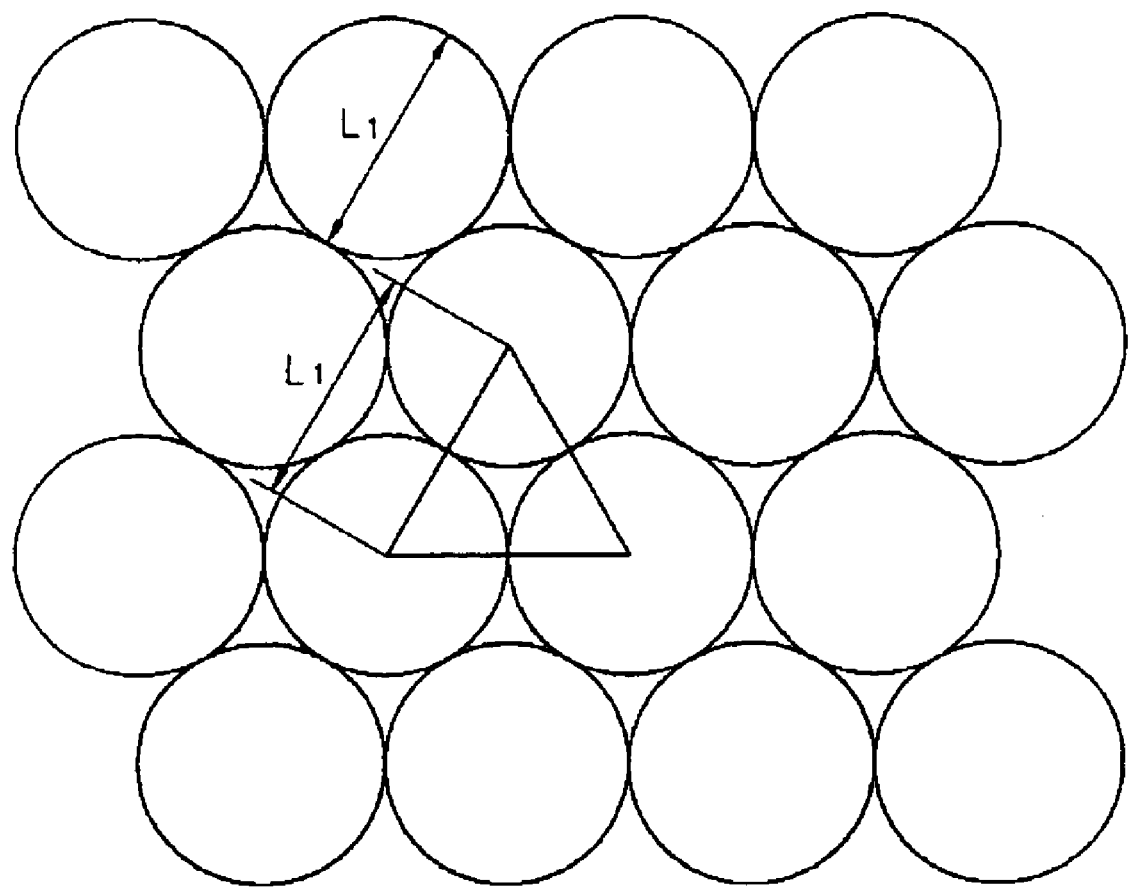

FIG. 7 shows LED devices 60 densely disposed on a surface. A distance between the two centers of adjacent circles corresponds to the effective length of the LED devices 60. In the illustration, each apex of a triangle is disposed at the center of an LED device 60, and each side of the triangle corresponding to the effective length of the LED devices 60.

Figure 8:
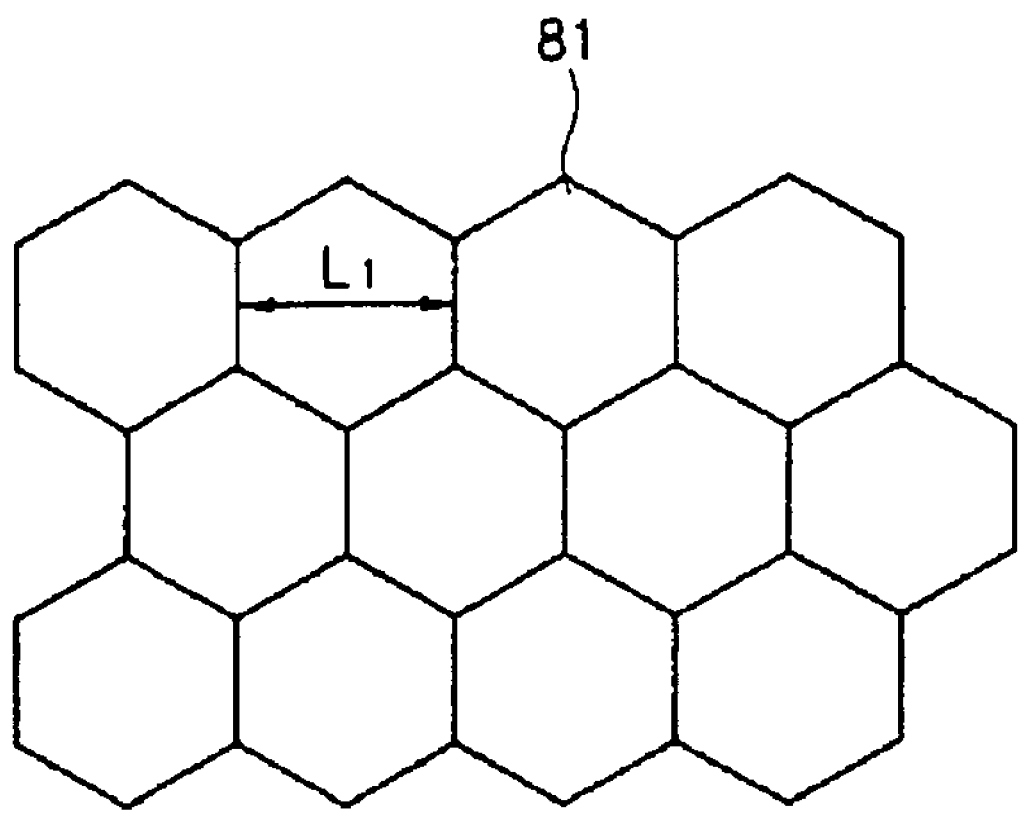

When circles are used to characterize the light provided by each LED device 60, as shown in FIG. 7, empty gaps are formed between circles at the center of the triangle. Thus, a surface may be divided into an array of regular hexagons to fill the entire surface, as shown in FIG. 8. A distance between the two opposing sides of each regular hexagon corresponds to the effective length of the LED devices 60. In addition, the distance between the two centers of adjacent regular hexagons also corresponds to the effective length. When an LED device 60 is disposed in the center of each hexagon, as shown in FIG. 8, the LCD panel 20 may be provided with light having the same intensity regardless of the location on the surface of the LCD panel 20. If the LED devices 60 provide white light, the LCD panel 20 is provided with uniform white. If the LED devices 60 provide red light, the LCD panel 20 is provided with uniform red light.

Here, the LED device 60 disposed in each regular hexagon may not be positioned precisely in the center of the hexagon. However, since a distance between LED devices 60 should correspond to the effective length, each LED device 60 should be disposed at the same distance from the adjacent LED devices 60. Also, each of red, green and blue LEDs 60a, 60b, 60c is respectively disposed in the regular hexagon and collectively provide white light. In this case, each color of the LEDs should be regularly disposed.

FIG. 8 illustrates the case of a surface having no boundaries. However, an actual arrangement surface for an LCD panel 20 has a predetermined size.

As shown in FIG. 3, an arrangement surface according to the first embodiment has a rectangular shape having a long side length L2 and a short side length L3. Four types of surface units of the surface light source 80 are provided: an inside cell 81 fully contained within the boundaries of the arrangement surface, short side cells 82a, 82b, which intersect with the short side of the arrangement surface, long side cells 83, which intersect with the long side of the arrangement surface, and corner cells 84a, 84b, which intersect with a corner of the arrangement surface. The inside cells 81 are arranged such that a pair of opposing sides of each inside cell 81 are disposed parallel with the short side of the arrangement surface.

A white light providing unit 61 is provided in each inside cell 81. The length between the two opposing sides in each inside cell 81 corresponds to a cell length L1, which corresponds to the effective length of the LED device 60. There may be some variation between the effective length of the LED device 60 and the cell length L1. For example, the cell length L1 may be between 90 and 110% of the effective length.

The white light providing unit 61 comprises a red LED 60a, a blue LED 60c, and a pair of green LEDs 60b. The effective length of each LED device 60 may be substantially same. If the effective length of each LED is different, the cell length L1 may correspond to the shortest effective length or an average effective length.

As shown in FIG. 3, in the white light providing unit 61, the pair of green LEDs 60b are disposed in a line parallel to the long side of the arrangement surface. The red LED 60a and the blue LED 60c are disposed in a line parallel to the short side direction between the pair of green LEDs 60b. Each color of the LED devices 60 contributes to the brightness in order of the green LED 60b, the red LED 60a, and the blue LED 60c. According to the first embodiment, a second short-side cell 82b not comprising the white light providing unit 61 is disposed at both ends of the long side. Thus, if the green LED 60b, which is the greatest contributor to the overall brightness, is disposed in the long side direction, the green LED 60b can supplement the decreased brightness in the second short side cell 82b.

The short side cells 82a, 82b comprise a first short side cell 82a having an area which is more than 50% of the area of the inside cell 81, and a second short cell 82b having an area which is less than 50% of the area of the inside cell 81. The first short side cell 82a includes the white light providing unit 61 but the second short side cell 82b does not. The first and the second short side cells 82a, 82b are alternatingly provided along the short side of the arrangement surface.

An area of the second short side cell 82b should be decreased, if possible, since the short side cell 82b does not include a white light providing unit 61, thereby lowering the brightness in the second short cell 82b. Meanwhile, an area of the first short side cell 82a should be more than 50% of the area of the inside cell 81, since it is desirable to maximize the size of the white light providing unit 61 disposed in the center of the unit of the surface light source 80. Therefore, a short side cell's 82b length L4, L5 in the long side direction is preferably a little bit longer than a distance sufficient for the white light providing unit 61 to be disposed in the first short side cell 82a. This arrangement can be achieved when the long side length L2 is expressed as a sum of an integer N times a half of the cell length L1, plus 10% to 40% of the cell length L1. The long side length L2 according to the embodiment is expressed as L2=(L1/2)×13+L1×0.3. For example, provided that the cell length L1 is 8 cm and a white light providing unit's 61 length L6 is 2 cm, L4 and L5 respectively are 1.2 cm, which is (L1×0.3)/2. In this case, a first short cell's 82a length L7 in the long side direction is L1/2+L4, which equals 5.2 cm when L1=8 cm and L4=1.2 cm, so the first short cell 82a is wide enough to include the white light providing unit 61. A proper relation between the cell length L1 and the long side length L2 may be adjusted according to the size of the white light providing unit 61.

The boundary of the long side of the arrangement surface preferably intersects all of the cells at the same point. In other words, all of cells intersecting the long side of the arrangement surface (i.e., the long side cells 83) have an equal portion of the cell provided within the boundaries of the arrangement surface. A surface area of the long side cell 83 is preferably more than 60% of the surface area of the inside cell 81 so that the white light providing unit 61 is provided in each long side cell 83.

The corner cells 84a, 84b intersecting the corners of the arrangement surface include a first corner cell 84a, having a relatively wide surface area, and a second corner cell 84b, having a relatively small surface area. The first corner cell 84a is large enough to include the white light providing unit 61, while the second corner cell 84b is too small to include the white light providing unit 61.

According to the first embodiment mentioned above, the LED devices 60 are disposed in a regular arrangement. Thus, the white light providing units 61 are disposed in a line on the rectangular LED circuit board 51 at an interval corresponding to the cell length. Similarly, the LED apertures 41 which correspond to the white light providing units 61 are regularly disposed on the reflecting plate 40.

Hereinbelow, a second embodiment through an eighth embodiment of the present invention will be described with reference to FIGS. 9 through 15.

Figure 9:
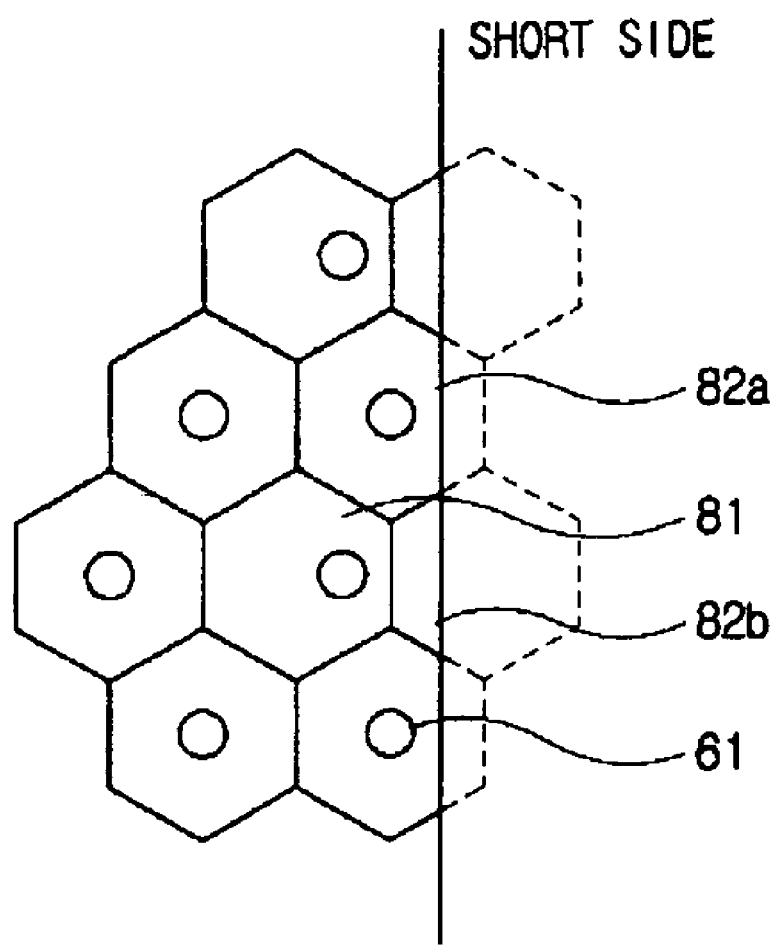
FIGS. 9 through 15 illustrate an arrangement of an LED according to a second through an eighth embodiments of the present invention, respectively.

FIG. 9 shows an arrangement of an LED according to the second embodiment. A pair of opposing sides in an inside cell 81 are disposed parallel with a short side of an arrangement surface, as in the first embodiment described above. On the short side are disposed first short side cells 82a including white light providing units 61 and second short side cell 82b not including white light providing units 61. The first short side cells 82a and second short side cells 82b are alternatingly provided along the short side boundary of the arrangement surface.

According to the second embodiment, the LED devices 60 are not provided in a regular arrangement. In other words, not all of the white light providing units 61 are provided in the center of the cells. The white light providing units 61 in the inside cells 81 closest to the short side are disposed at a position closer to the short side. This arrangement supplements the brightness of the second short side cells 82 which do not include white light providing units 61.

The distance between the LED devices 60 and an LCD panel 20 should be increased to provide good color mixing of the LED device 60. In contrast, the distance between the LED device 60 and the LCD panel 20 should be reduced in order to provide the LCD 1 with a thin profile. Due to the desire to obtain a thin LCD 1, adjusting the effective length by increasing the distance between the LED device 60 and the LCD panel 20 can be difficult. In addition, the size of the LCD panel 20 is also not easily adjusted. Accordingly, the optimal relationship between the size of the arrangement surface and the effective length, as in the first and the second embodiments, may not be easily acquired. Accordingly, a formation of a unit of a surface light source 80 may be acquired differently from the first embodiment.

A third embodiment will be described with reference to FIG. 10.

Figure 10:
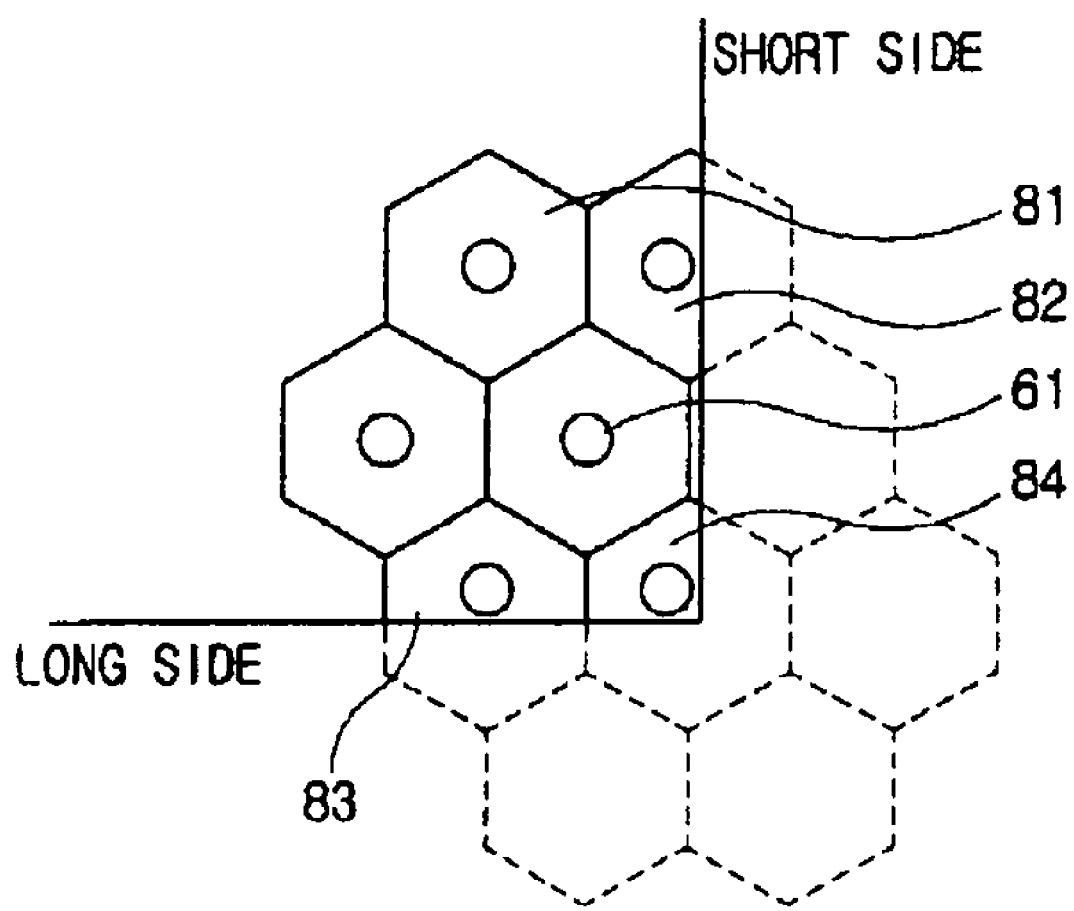

FIG. 10 shows an arrangement of an LED 60 according to the third embodiment. A pair of opposing sides in an inside cell 81 are disposed parallel with a short side of an arrangement surface. A short side cell 82 is bisected by a short side, thereby making its surface area approximately 50% of an area of the inside cell 81. A white light providing unit is provided in the short side cell 82 at a position closer to the side of the short side cell 82 than in the inside cell 81. A long side cell 83 is also bisected by a long side, thereby making its surface area approximately 50% of the surface area of the inside cell 81. A white light providing unit is also provided in the long side cell 83 at a position closer to the top of the long side cell 83 than in the inside cell 81. A corner cell 84 is intersected by both the long side and the short side, thereby making its surface area approximately 25% of the surface area of the inside cell 81. A white light providing unit is also provided in the corner cell 84 at a position closer to the upper left side of the corner cell 84 than in the inside cell 81.

The surface areas of the short side cell 82, the long side cell 83, and the corner cell 84 according to the third embodiment are smaller than the surface areas in the first embodiment, but the white light providing units 61 are provided in all the cells. However, it may not be efficient to provide a white light providing unit 61 in every unit of a surface light source 80 regardless of its size.

White light providing units 61 may only be provided in units which are larger than a predetermined size. For example, white light providing units 61 may only be provided in short side cells 82 and long side cells 83 having surface areas that are at least 30% of the surface area of the inside cell 81. Alternatively, white light providing units 61 may only be provided in short side cells 82 and long side cells 83 having surface areas that are at least 50% of the surface area of the inside cell 81.

The corner cell 84, however, is provided with light from only two adjacent units of the surface light source 80, while the short side cell 82 and the long side cell 83 are provided with light from three adjacent units of the surface light source 80. Because the corner cell 84 has fewer adjacent units with white light providing units 61, it would be preferable to provide a white light providing unit 61 in the corner cell 84, even though its surface area is small. Thus, the minimum predetermined surface area for a corner cell to receive a white light providing unit 61 may be less than the minimum predetermined surface area for side cells. In the present example, a corner cell having only a surface area that is at least 20% of the surface area of an inside cell would be provided with a white light providing unit 61. Since the corner cell 84 has a surface area that is 25% of the surface area of the inside cell 81, the corner cell 84 is provided with a white light providing unit 61.

In the second and the third embodiments mentioned above, the LED devices 60 are disposed irregularly. More specifically, in the second embodiment, the white light providing units 61 in the inside cells 81 are disposed irregularly. In the second embodiment, the white light providing units 61 in the inside cells 81 closest to the side boundaries of the arrangement surface are not positioned at the center of the inside cells 81. In the third embodiment, the white light providing units 61 disposed in the inside cells 81 are disposed regularly.

However, the white light providing units 61 are disposed irregularly in the short side cell 82, the long side cell 83, and the corner cell 83.

In the second and the third embodiments, the white light providing units 61 are irregularly disposed depending on the irregular arrangement of LED devices 60. In addition, depending on the arrangement of the LED devices 60, an interval of LED circuit boards 51 may be disposed irregularly. Also, the LED apertures 41 in the reflecting plate 40 are irregularly disposed to correspond to the arrangement of the LED devices 60.

Hereinbelow, white light providing units 61 according to fourth and fifth embodiments will be described with reference to FIGS. 11 and 12.

Figure 11:
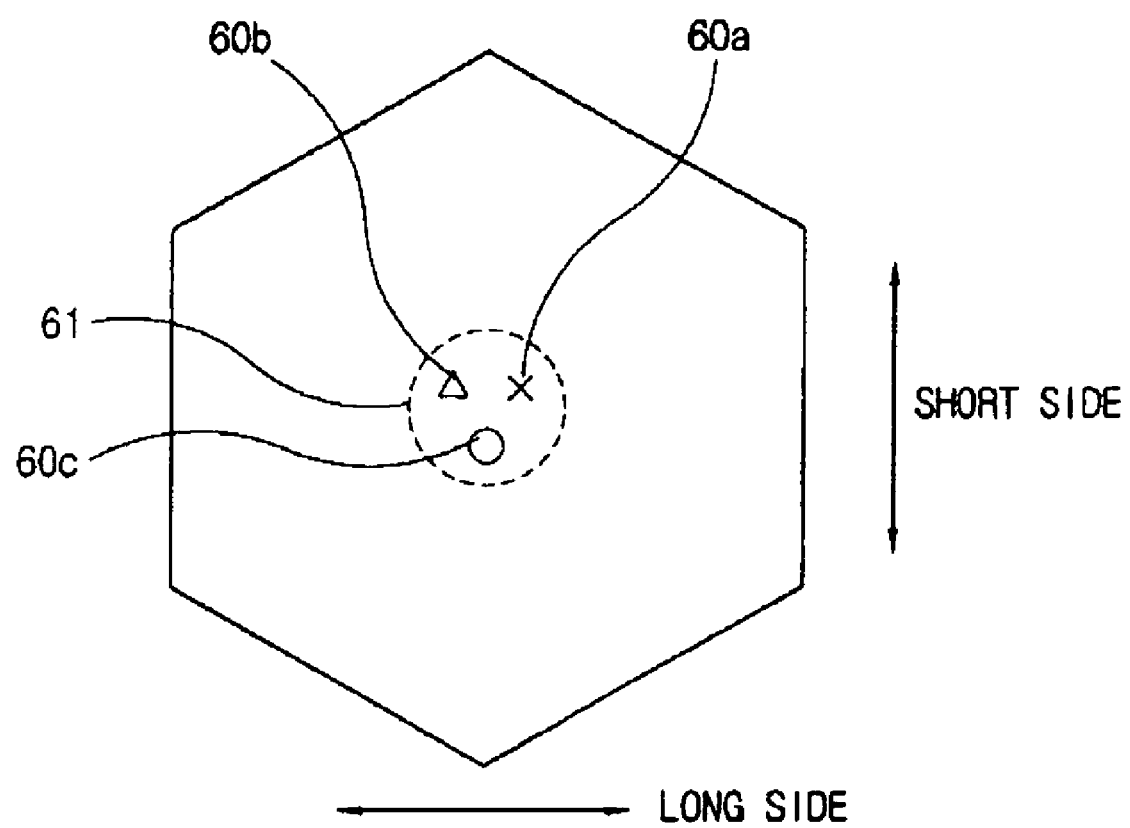

FIG. 11 shows an arrangement of an LED device 60 according to the fourth embodiment. The white light providing unit 61 according to the fourth embodiment comprises a red LED 60a, a green LED 60b, and a blue LED 60c, respectively. The white light providing unit 61 is disposed in the center of an inside cell 81. Each LED device 60 is disposed in a triangular arrangement, with the red and green LEDs 60a, 60b disposed in the direction corresponding to the long side of the arrangement surface.

Figure 12:
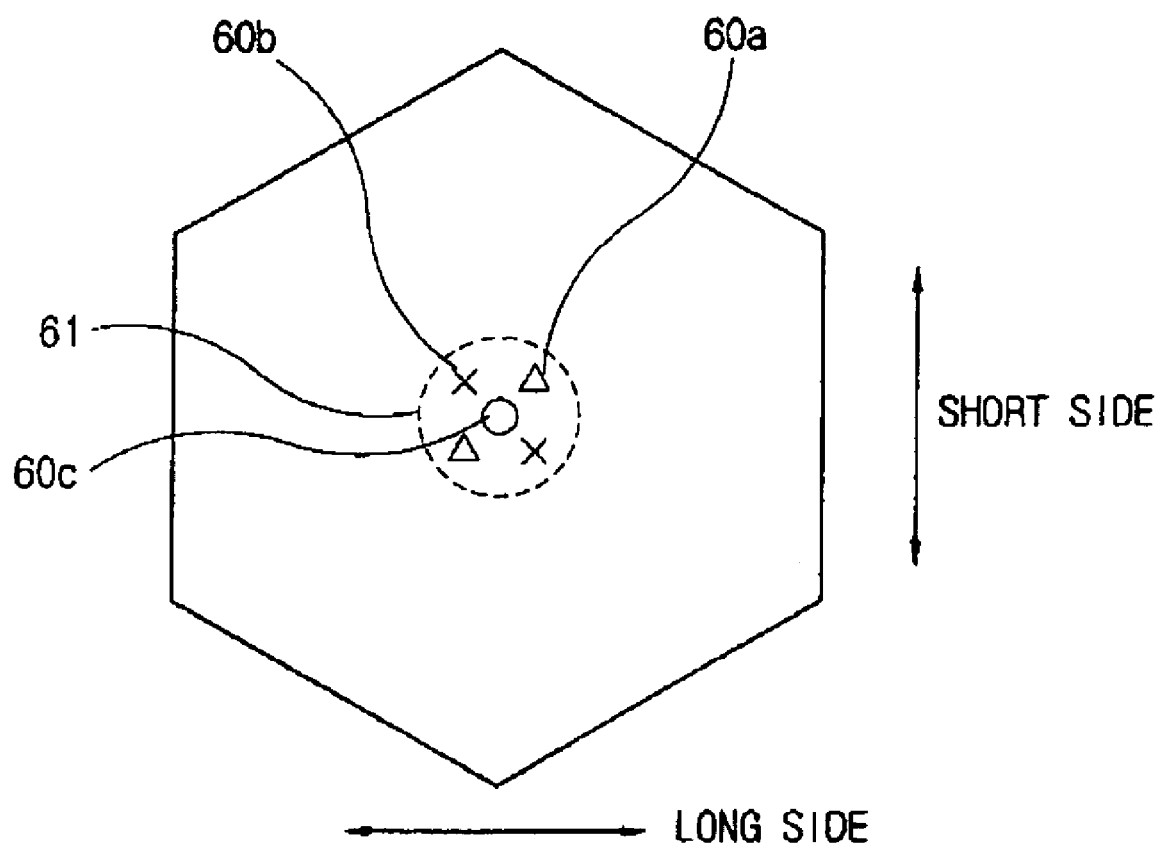

FIG. 12 shows an arrangement of an LED device 60 according to the fifth embodiment. The white light providing unit 61 according to the fifth embodiment comprises a pair of red LEDs 60a, a pair of green LEDs 60b, and a blue LED 60c. The white light providing unit 61 is disposed in the center of an inside cell 81. The red and green LEDs 60a, 60b are disposed in a square arrangement, where opposing sides of the square are parallel to the long side of the arrangement surface, with the pair of red LEDs 60a and the pair of green LEDs 60b provided at opposing corners of the square, respectively. The blue LED 60c is disposed in the center of the square. A unit of a surface light source 80 not having the white light providing unit 61 is disposed in the short side rather than in the long side. Accordingly, if the red and green LEDs 60a, 60b, which are the greatest contributors to the overall brightness of the white light providing unit 61, are disposed in the long side direction, the brightness decrease in the second short side cell 82b not including a white light providing unit 61 may be supplemented. The brightness in the long side direction is increased due to the red and green LEDs 60a, 60b which are disposed along the long side direction. Thus, the brightness of both ends in the long side direction is increased.

In a sixth embodiment described below, an arrangement of the long and short sides of the arrangement surface is different from the arrangement in the first embodiment.

Figure 13:
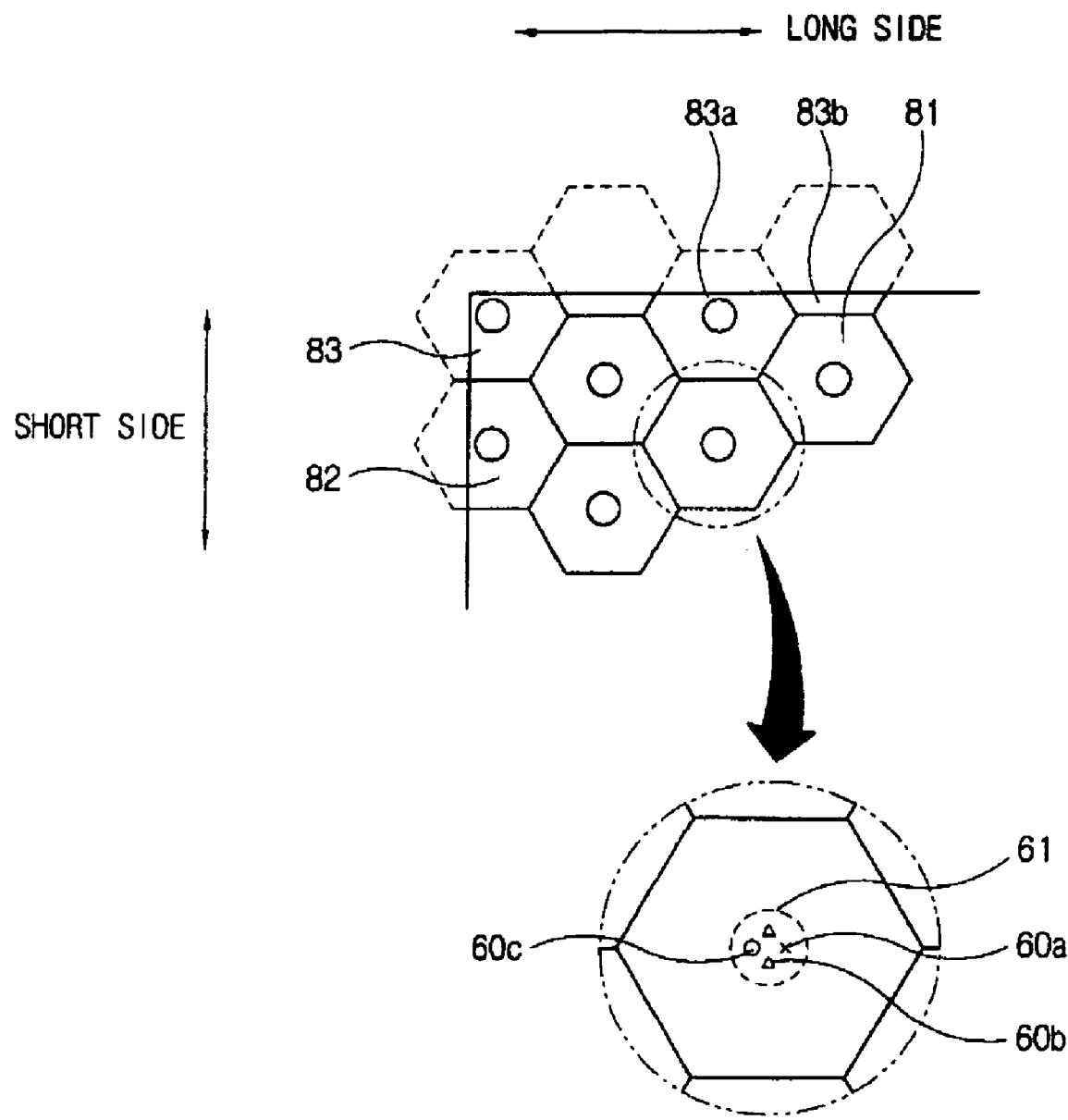

FIG. 13 shows an arrangement of LED devices 60 according to the sixth embodiment. A pair of opposing sides in an inside cell 81 are disposed parallel with a long side. A short side cell 82 including a white light providing unit 61 intersects the short side of the arrangement surface. A first long side cell 83a including a white light providing unit 61 and a second long side cell 83b not including a white light providing unit 61 are alternatingly provided along the long side of the arrangement surface. The white light providing unit 61 comprises a red LED 60a and a blue LED 60c and a pair of green LEDs 60b. The green LEDs 60b are disposed in a line parallel to the short side of the arrangement surface. The red and blue LEDs 60a, 60c are provided in a line parallel to the long side of the arrangement surface between the green LEDs 60b. If the green LED 60b, which are the greatest contributors to the overall brightness are disposed in the short side direction, the brightness decrease in the second long cell 83b may be supplemented.

Also, in the arrangement provided in the sixth embodiment, a unit of a surface light source 80 having various shapes may be formed depending on the relationship between the effective length and the size of the arrangement surface. Here, the arrangement of the white light providing unit 61 of the unit of the surface light source 80 may follow the second or the third embodiments.

A seventh and an eighth embodiments described below additional embodiments of a white light providing unit 61.

Figure 14:
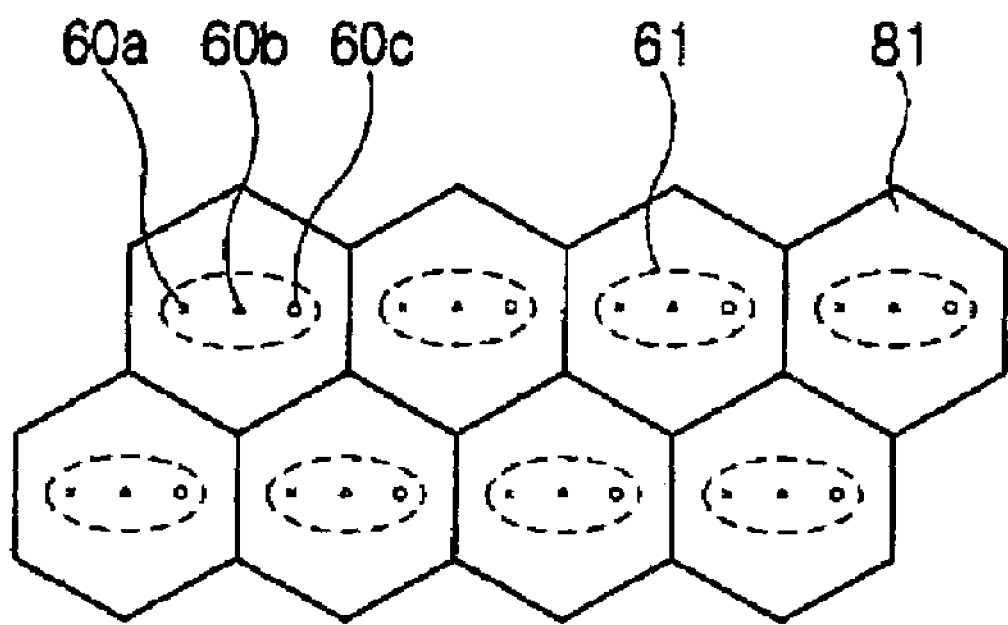

FIG. 14 shows an arrangement of an LED device 60 according to the seventh embodiment. The white light providing unit 61 comprises a red LED 60a, a green LED 60b and a blue LED 60c respectively. Each LED device 60 is disposed in a line in an inside cell 81. The white light providing unit 61 and each LED device 60 within the white light providing unit 61 may be disposed regularly.

Figure 15:
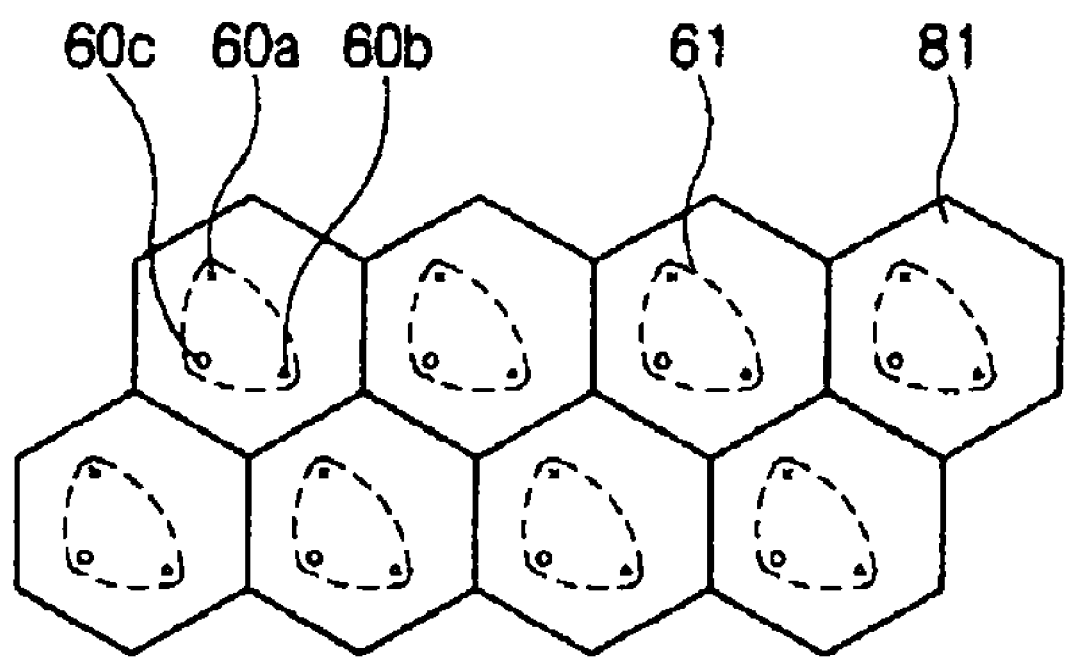

FIG. 15 shows an arrangement of an LED device 60 according to the eighth embodiment. The white light providing unit 61 comprises a red LED 60a, a green LED 60b, and a blue LED 60c. The LED devices 60 are disposed into an approximately triangular arrangement. The white light providing unit 61 and each LED device 60 is disposed regularly.

Although various embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A backlight unit comprising:
   an arrangement surface; and
   a plurality of point light sources arranged in the arrangement surface;
   wherein the arrangement surface is divided into an array of cells, the array of cells comprising a plurality of hexagonal cells having a white light providing unit, wherein the white light providing unit comprises two or more of the point light sources and is disposed within the hexagonal cell, and wherein at least two of the two or more point light sources generate light of different wavelengths.

2. The backlight unit according to claim of 1, wherein the hexagonal cells are regularly disposed on the arrangement surface and each side of each cell contacts a side of an adjacent cell.

3. The backlight unit according to claim of 1, wherein each of the point light sources comprises a light-emitting diode (LED).

4. The backlight unit according to claim of 3, wherein the array of cells comprises an array of inside cells having a regular hexagonal shape.

5. The backlight unit according to claim of 4, wherein within each inside cell, a position of the point light source is uniform.

6. The backlight unit according to claim of 4, wherein within each inside cell, a position of the point light source is not uniform.

7. The backlight unit according to claim of 4, wherein the arrangement surface has a rectangular shape having a long side and a short side.

8. The backlight unit according to claim of 7, wherein the array of cells further comprises a plurality of long side cells intersecting the long sides of the arrangement surface, a plurality of short side cells intersecting the short sides of the arrangement surface, and a plurality of corner cells intersecting corners of the arrangement surface.

9. The backlight unit according to claim of 8, wherein the long side of the arrangement surface is parallel with two opposing sides in the inside cells.

10. The backlight unit according to claim of 9, wherein each of the long side cells having a surface area at least 50% of the surface area of each of the inside cells is provided with the white light providing unit.

11. The backlight unit according to claim of 8, wherein the short side of the arrangement surface is parallel with two opposing sides in the inside cells.

12. The backlight unit according to claim of 11, wherein a cell length is defined as a distance between two opposing sides of an inside cell, and a long side length of the arrangement surface is defined as a sum of an integer times of a half of the cell length plus between 10% and 40% of the cell length.

13. The backlight unit according to claim of 11, wherein:
the short side cells comprise a first short side cell comprising the white light providing unit and a second short side cell not comprising the white light providing unit; and
the first and second short side cells are alternatingly arranged along the short sides of the arrangement surface.

14. The backlight unit according to claim of 11, wherein:
the long side cells are disposed in a line along each of the long sides of the arrangement surface; and
a surface area of each of the long side cells is at least 60% of the surface area of each of the inside cells.

15. The backlight unit according to claim of 14, wherein each of the long side cells includes one of the white light providing units.

16. The backlight unit according to claim of 11, wherein each of the white light providing units comprises a pair of green LEDs, and the pair of green LEDs are disposed in a direction parallel to the long sides of the arrangement surface.

17. The backlight unit according to claim of 11, wherein each of the white light providing units comprises a pair of red LEDs, and the pair of red LEDs are disposed in a direction parallel to the long sides of the arrangement surface.

18. The backlight unit according to claim of 8, wherein the corner cells having a surface area of at least 20% of the surface area of each of the inside cells includes one of the white light providing units.

19. The backlight unit according to claim of 8, wherein the short side cells and the long side cells having surface areas of at least 30% of the surface area of each of the inside cells includes one of the white light providing units.

20. The backlight unit according to claim of 19, wherein the short side cells and the long side cells having surface areas of at least 50% of the surface area of each of the inside cells is provided with one of the white light providing units.

21. An LCD comprising:
an LCD panel;
an arrangement surface disposed adjacent to the LCD panel; and
a plurality of point light sources arranged in the arrangement surface;
wherein the arrangement surface is divided into an array of cells, the array of cells comprising a plurality of hexagonal cells having a white light providing unit, wherein the white light providing unit comprises two or more of the point light sources and is disposed within the hexagonal cell, and wherein at least two of the two or more point light sources generate light of different wavelengths.

22. The LCD according to claim 21, wherein the hexagonal cells are regularly disposed on the arrangement surface, and each side of each cell contacts a side of an adjacent cell.

23. The LCD according to claim of 21, wherein each of the point light sources comprises a light-emitting diode (LED).

24. The LCD according to claim of 23, wherein the array of cells comprises an array of inside cells having a regular hexagonal shape.

25. The LCD according to claim of 24, wherein within each inside cell, a position of the point light source is uniform.

26. The LCD according to claim of 24, wherein within each inside cell, a position of the point light source is not uniform.

27. The LCD according to claim of 26, wherein the arrangement surface has a rectangular shape having a long side and a short side.

28. The LCD according to claim of 27, wherein the array of cells further comprises a plurality of long side cells intersecting the long side of the arrangement surface, a plurality of short side cells intersecting the short sides of the arrangement surface, and a plurality of corner cells intersecting corners of the arrangement surface.

29. The LCD according to claim of 28, wherein the short side of the arrangement surface is parallel with two opposing sides in the inside cells.

30. The LCD according to claim of 29, wherein a cell length is defined as a distance between two opposing sides of an inside cell, and a long side length of the arrangement surface is defined as a sum of an integer times of a half of the cell length plus between 10% and 40% of the cell length.

31. The LCD according to claim of 29, wherein:
the short side cells comprise a first short side cell comprising the white light providing unit and a second short side cell not comprising the white light providing unit; and
the first and second short side cells are alternatingly arranged along the short sides of the arrangement surface.

32. The LCD according to claim of 29, wherein:
the long side cells are disposed in a line along each of the long sides of the arrangement surface; and
a surface area of each of the long side cells is at least 60% of the surface area of each of the inside cells.

33. The LCD according to claim of 32, wherein each of the long side cells includes one of the white light providing units.

34. The LCD according to claim of 28, wherein the corner cells having a surface area of at least 20% of the surface area of each of the inside cells includes one of the white light providing units.

35. The LCD according to claim of 28, wherein the short side cells and the long side cells having surface areas of at least 30% of the surface area of each of the inside cells includes one of the white light providing units.

36. The LCD according to claim of 35, wherein the short side cells and the long side cells having surface areas of at least 50% of the surface area of each of the inside cells is provided with one of the white light providing units.

37. The LCD according to claim of 26, wherein each of the white light providing units comprises a pair of green LEDs, and the pair of green LEDs are disposed in a direction parallel to the long sides of the arrangement surface.

38. The LCD according to claim of 26, further comprising a plurality of circuit boards arranged in parallel at regular intervals.

39. The LCD according to claim of 38, wherein the white light providing units are disposed on the plurality of circuit boards at a regular interval.

40. The LCD according to claim of 39, wherein the white light providing units are provided in a staggered arrangement on the adjacent circuit boards.

41. The LCD according to claim of 23, wherein a cell length is defined as a distance between two opposing sides of an inside cell and corresponds to an effective length of the point light sources.

42. The LCD according to claim of 23, wherein a cell length is defined as a distance between two opposing sides of an inside cell, and is between 90% and 110% of an effective length of the point light sources.

43. The LCD according to claim of 23, wherein the effective lengths of each of the point light sources are substantially equal.

44. An arrangement method of a plurality of point light source comprising:

disposing the point light sources to dispose a white light providing unit in a regular hexagonal shape continually on an arrangement surface corresponding to an LCD panel, wherein the arrangement surface is divided into an array of cells, the array of cells comprising a plurality of hexagonal cells, wherein the white light providing unit comprises two or more of the point light sources and is disposed within the hexagonal cell, and wherein at least two of the two or more point light sources generate light of different wavelengths.

45. The backlight unit according to claim of 1, wherein the two or more point light sources of the white light providing unit comprises a red LED, a green LED and a blue LED.

46. The backlight unit according to claim of 21, wherein the two or more point light sources of the white light providing unit comprises a red LED, a green LED and a blue LED.

47. The arrangement method according to claim of 44, wherein the two or more point light sources of the white light providing unit comprises a red LED, a green LED and a blue LED.

* * * * *

UNITED STATES PATENT AND TRADEMARK OFFICE
CERTIFICATE OF CORRECTION

PATENT NO. : 7,649,593 B2
APPLICATION NO. : 11/400300
DATED : January 19, 2010
INVENTOR(S) : Yoon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 338 days.

Signed and Sealed this

Twenty-third Day of November, 2010

David J. Kappos
*Director of the United States Patent and Trademark Office*